An example system includes: a communication device including a first wireless communication part performing short-distance wireless communication; and an information processing apparatus including a second wireless communication part performing short-distance wireless communication, a processing part performing processing concerning input or output of information, a restriction part, in correspondence to the processing of one of the second wireless communication part and the processing part, restricting the processing of the other, and an information processing part performing information processing corresponding to a processing result of the second wireless communication part or the processing part whose processing is not restricted by the restriction part.

16 Claims, 6 Drawing Sheets

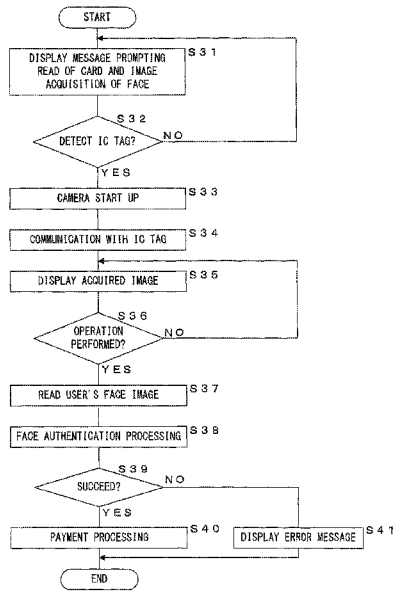

(51) Int. Cl.
*A63F 13/211* (2014.01)
*H04W 4/80* (2018.01)
*A63F 13/31* (2014.01)
*A63F 13/327* (2014.01)
*A63F 13/216* (2014.01)
*A63F 13/213* (2014.01)
*A63F 13/235* (2014.01)
*A63F 13/655* (2014.01)

(52) U.S. Cl.
CPC .......... *A63F 13/216* (2014.09); *A63F 13/235* (2014.09); *A63F 13/327* (2014.09); *A63F 13/73* (2014.09); *A63F 13/95* (2014.09); *H04W 4/80* (2018.02); *A63F 13/655* (2014.09); *A63F 2300/1031* (2013.01); *A63F 2300/69* (2013.01)

(56) References Cited

U.S. PATENT DOCUMENTS

| | | |
|---|---|---|
| 2010/0144434 A1 | 6/2010 | Leingang et al. |
| 2010/0274902 A1 | 10/2010 | Penman et al. |
| 2010/0312381 A1 | 12/2010 | Kameda |
| 2012/0071151 A1 | 3/2012 | Abramson |
| 2012/0252578 A1 | 10/2012 | Ozaki et al. |
| 2013/0104203 A1* | 4/2013 | Davis .................... H04L 9/3231 726/5 |
| 2013/0314339 A1 | 11/2013 | Ueki |
| 2013/0324045 A1 | 12/2013 | Shimohata et al. |

FOREIGN PATENT DOCUMENTS

| | | |
|---|---|---|
| JP | 2005-352538 | 12/2005 |
| JP | 2006-109326 | 4/2006 |
| JP | 2007-166197 | 6/2007 |
| JP | 2007-316981 | 12/2007 |
| JP | 2008-083943 | 4/2008 |
| JP | 2008-227758 | 9/2008 |
| JP | 2008-310713 | 12/2008 |
| JP | 2009-009520 | 1/2009 |
| JP | 2009-205631 | 9/2009 |
| JP | 2009-251981 | 10/2009 |
| JP | 2010-015532 | 1/2010 |
| JP | 2010-020498 | 1/2010 |
| JP | 2010-072891 | 4/2010 |
| JP | 2010-097314 | 4/2010 |
| JP | 2011-129030 | 6/2011 |
| JP | 2011-141679 | 7/2011 |
| JP | 2011-141815 | 7/2011 |
| JP | 2011-205435 | 10/2011 |

* cited by examiner

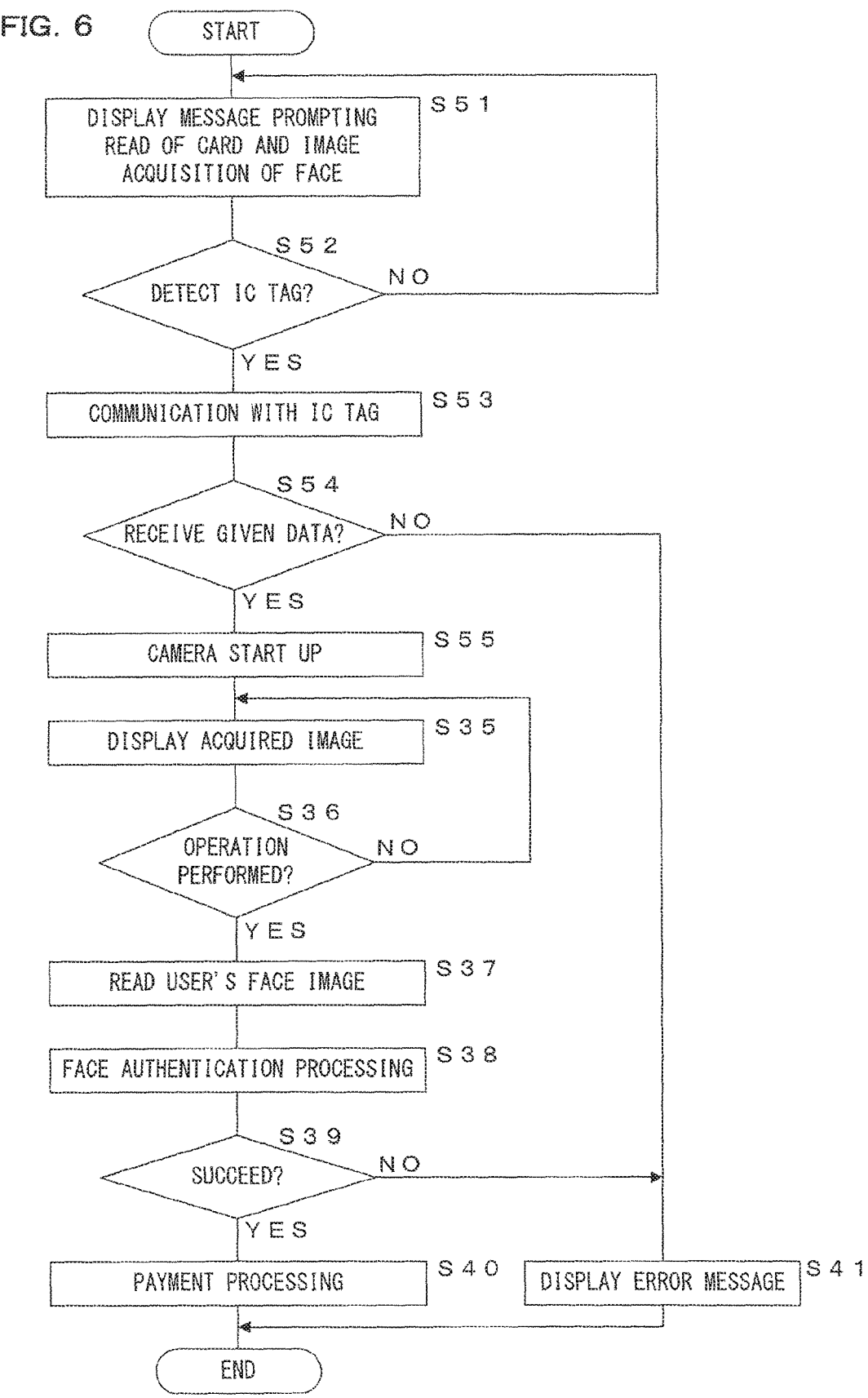

INFORMATION PROCESSING SYSTEM, GAME SYSTEM, INFORMATION PROCESSING APPARATUS, RECORDING MEDIUM, AND INFORMATION PROCESSING METHOD

CROSS-REFERENCE TO RELATED APPLICATIONS

This application is a continuation of application Ser. No. 13/872,429 filed Apr. 29, 2013, which claims priority to Japanese Patent Application No. 2012-126323, filed on Jun. 1, 2012, the entire contents of which each are incorporated herein by reference.

FIELD

The technique herein relates to an information processing system, a game system, an information processing apparatus, a recording medium, and an information processing method in which information processing is performed in accordance with wireless communication with a communication device.

BACKGROUND AND SUMMARY

Such systems are widely spread that an IC (Integrated Circuit) chip is embedded in a card type medium or the like and then contactless communication by wireless is performed between the IC chip and an information processing apparatus so that data is exchanged. Such communication techniques are known as NFC (Near Field Communication) and RFID (Radio Frequency IDentification), and allow the information processing apparatus to perform wireless communication with the IC chip in a short distance of a few centimeters to a few meters. In recent years, the function of such wireless communication begins to be installed in game machines, portable telephones, and the like.

According to an aspect of the embodiment, an information processing system includes: a communication device including a first wireless communication part performing the processing of transmission and reception of data to and from an information processing apparatus through short-distance wireless communication; and an information processing apparatus including a second wireless communication part performing the processing of transmission and reception of data to and from the communication device through short-distance wireless communication, a processing part performing processing concerning input or output of information, a restriction part, in correspondence to the processing of one of the second wireless communication part and the processing part, restricting the processing of the other, and an information processing part performing information processing corresponding to a processing result of the second wireless communication part or the processing part whose processing is not restricted by the restriction part.

The object and advantages of the invention will be realized and attained by means of the elements and combinations particularly pointed out in the claims.

It is to be understood that both the foregoing general description and the following detailed description are exemplary and explanatory and are not restrictive of the invention.

This and other purposes, features, aspects, and effects of the present technique will become clearer from the following detailed description given with respect to the accompanying drawings.

BRIEF DESCRIPTION OF THE DRAWINGS

FIG. 6 shows an example non-limiting flow chart of a procedure of restriction processing for a camera performed by a game machine according to Modification 1 of Embodiment 3.

DETAILED DESCRIPTION OF NON-LIMITING EXAMPLE EMBODIMENTS

Embodiment 1

Figure 1:
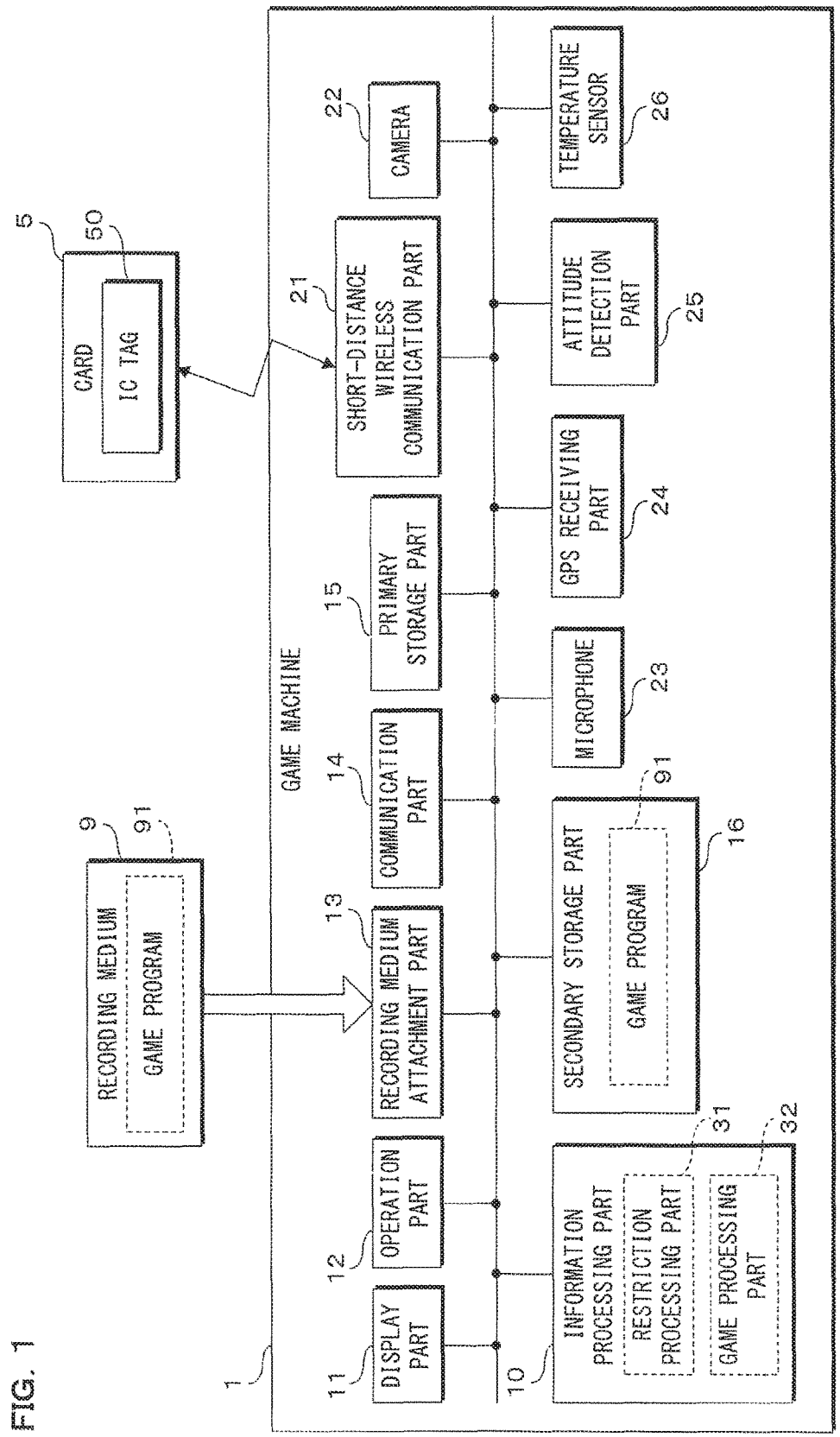
FIG. 1 shows an example non-limiting block diagram of a configuration of a game system according to an embodiment.
Figure 2:
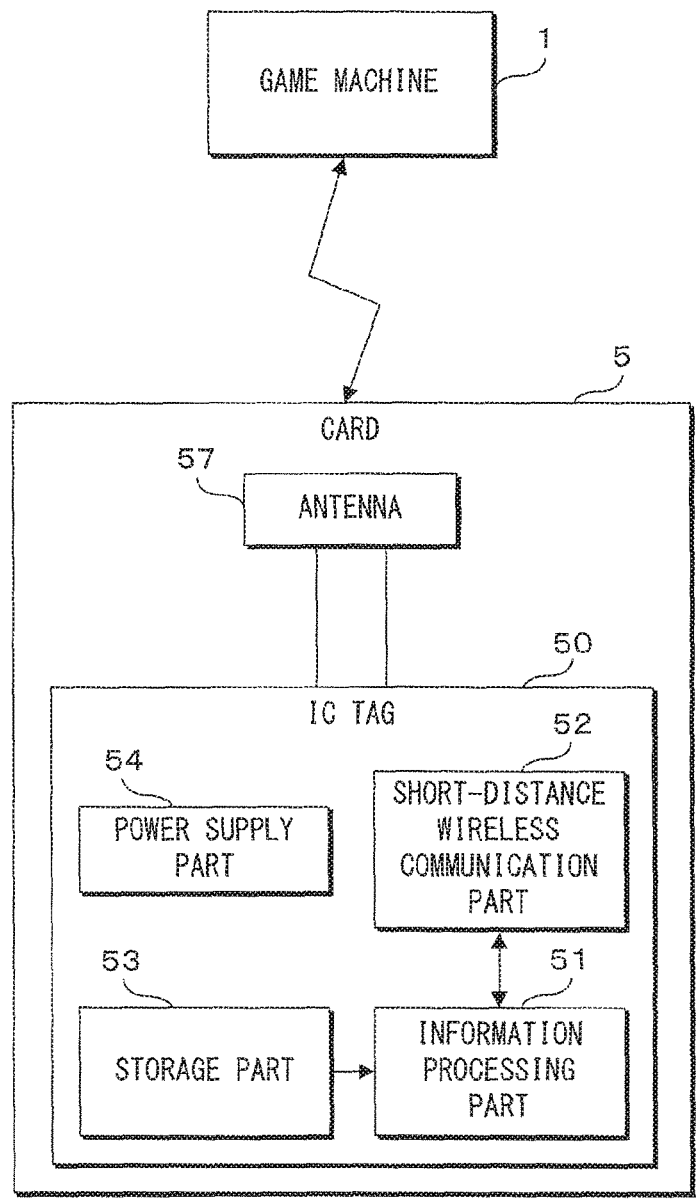
FIG. 2 shows an example non-limiting block diagram of a configuration of a game system according to an embodiment.

FIGS. 1 and 2 show example non-limiting block diagrams of the configuration of a game system according to the present embodiment. The game system according to the present embodiment includes: a portable game machine 1 which is allowed to be carried by a user; and one or a plurality of cards 5. The detailed configuration of the game machine 1 is illustrated in FIG. 1. The configuration of the card 5 is illustrated in FIG. 2.

As illustrated in FIG. 1, the portable game machine 1 includes an information processing part 10, a display part 11, an operation part 12, a recording medium attachment part 13, a communication part 14, a primary storage part 15, a secondary storage part 16, and a short-distance wireless communication part 21. The information processing part 10 of the game machine 1 is constructed from an arithmetic processing unit such as a CPU (Central Processing Unit) and an MPU (Micro Processing Unit). The information processing part 10 reads onto the primary storage part 15 a game program 91 stored in the secondary storage part 16 or a game program 91 recorded in a recording medium 9 attached to the recording medium attachment part 13, and then executes the program. By virtue of this, the information processing part 10 performs various kinds of information processing concerning the game. For example, the information processing part 10 performs the processing of accepting an operation carried out in the operation part 12. For example, the information processing part 10 performs the processing of determination or the like in the game in correspondence to a accepted operation. Further, for example, in response to a accepted operation or an event in the game, the information processing part 10 performs the processing of generating a game image to be displayed on the display part 11.

The display part 11 is constructed from a liquid crystal panel, a PDP (Plasma Display Panel), or the like. The display part 11 displays the image provided from the information processing part 10. For example, the operation part 12 is constructed from push buttons or from a touch panel provided in the display part 11. The operation part 12 notifies the information processing part 10 of the contents of the operation carried out by the user. The contents of an operation are, for example, push, release or the like of a button. The recording medium attachment part 13 is constructed such that a recording medium 9 of card type, cassette type, disk type, or the like is allowed to be attached and detached. The information processing part 10 is allowed to read the game program 91 or other data from the recording medium 9 attached to the recording medium attachment part 13.

The communication part 14 transmits and receives data to and from a server apparatus, another game machine 1, or the like through a network such as a portable telephone network or a wireless LAN (Local Area Network). For example, the game machine 1 performs communication with the server apparatus through the communication part 14, thereby downloads the game program 91, and then stores the program into the secondary storage part 16. The primary storage part 15 is constructed from a semiconductor memory device or the like. The primary storage part 15 temporarily stores various kinds of data generated in association with arithmetic processing of the information processing part 10. The secondary storage part 16 is constructed from a nonvolatile storage device having a larger capacity than the primary storage part 15. The secondary storage part 16 stores the game program 91, other data and the like.

For example, in accordance with a telecommunication standard of ISO/IEC18092 (a so-called NFC) or the like, the short-distance wireless communication part 21 performs contactless data transmission and reception by wireless to and from an IC tag 50 embedded in the card 5. The distance of communication with the card 5 performed by the short-distance wireless communication part 21 is a few centimeters to a few meters. The short-distance wireless communication part 21 transmits to the IC tag 50 of the card 5 a signal instructing read of stored data. As a response to this signal, the short-distance wireless communication part 21 receives desired data from the IC tag 50. That is, the short-distance wireless communication part 21 has the function of a so-called IC tag reader. The short-distance wireless communication part 21 may be constructed such as to transmit a signal instructing write, together with write data and thereby causing the IC tag 50 to achieve data write. That is, the short-distance wireless communication part 21 may have the function of an IC tag writer.

The short-distance wireless communication part 21 periodically repeats the processing of transmitting control information and the like. Depending on a situation whether a response to this transmission has been received, the short-distance wireless communication part 21 detects the presence of the card 5 within a communication area. The short-distance wireless communication part 21 notifies the information processing part 10 of a situation whether the presence of the card 5 has been detected within the communication area. When the card 5 is present within the communication area, the short-distance wireless communication part 21 transmits a data transmission request to the card 5 on the basis of the processing of the information processing part 10. The short-distance wireless communication part 21 receives data transmitted from the card 5 as a response to this request, and then provides the data to the information processing part 10. On the basis of the data received from the card 5, the information processing part 10 performs various kinds of processing concerning the game.

The game machine 1 according to the present embodiment includes, for example, a camera 22, a microphone 23, a GPS receiving part 24, an attitude detection part 25, and a temperature sensor 26. The camera 22 performs acquisition of a static image or a video image. The camera 22 outputs the image data obtained by image acquisition, to the information processing part 10. The microphone 23 accepts sound input such as users' conversation. The microphone 23 outputs sound data expressing the accepted sound input, to the information processing part 10. The GPS receiving part 24 receives a signal transmitted from a GPS satellite and then outputs a receiving result to the information processing part 10. On the basis of the receiving result provided from the GPS receiving part 24, the information processing part 10 performs the processing of calculating the location of the game machine 1. The location of the game machine 1 is expressed, for example, by the longitude, the latitude, and the like. The temperature sensor 26 detects the surrounding temperature of the game machine 1 and then transmits the detection result to the information processing part 10.

The attitude detection part 25 includes one or a plurality of sensors such as an acceleration sensor, a gyro sensor, and a magnetic sensor. On the basis of the detection results of these sensors, the attitude detection part 25 detects the attitude of the game machine 1. The attitude detection part 25 may detect the motion of the game machine 1. For example, when the attitude detection part 25 has an acceleration sensor, in a stationary state of the game machine 1, the acceleration sensor detects the acceleration due to gravity. This allows the attitude detection part 25 to calculate the inclination of the game machine 1 relative to the vertical direction on the basis of the detection result of the acceleration sensor. When the game machine 1 is in a moving state, the acceleration sensor detects an acceleration corresponding to the motion. This allows the attitude detection part 25 to calculate the moving speed, the moving direction, the position, and the like of the game machine 1. For example, when the attitude detection part 25 has a gyro sensor, the gyro sensor detects the value of time integral of the angular velocity, that is, the rotation angle. In accordance with the rotation angle detected by the gyro sensor, the attitude detection part 25 calculates the inclination, the position, and the like of the game machine 1. The attitude detection part 25 may be constructed such as to detect the attitude of the game machine 1 on the basis of the detection result of one sensor. However, when a plurality of sensors are employed, the attitude detection part 25 detects the attitude of the game machine 1 with higher precision.

As illustrated in FIG. 2, the card 5 is an electronic medium having a configuration that, for example, the above-mentioned IC tag 50 and an antenna 57 are embedded into an approximately rectangular paper, synthetic resin, or the like. The antenna 57 may have a configuration that, for example, a metal wire in a spiral shape is arranged inside the card 5 and then the both ends are connected to the IC tag 50. The IC tag 50 is provided in the form of one IC chip. The IC tag 50 includes, for example, an information processing part 51, a short-distance wireless communication part 52, a storage part 53, and a power supply part 54.

The IC tag 50 does not have an electric power source such as a battery. Thus, the IC tag 50 operates on the basis of an electromotive force generated by electromagnetic induction or the like when the antenna 57 receives a wireless signal from the game machine 1. The IC tag 50 is a tag of so-called passive type. On the basis of the above-mentioned electromotive force, the power supply part 54 supplies electric power to the information processing part 51, the short-distance wireless communication part 52, the storage part 53, and the like inside the IC tag 50. Operation of the individual parts is allowed by this electric power supply.

The short-distance wireless communication part 52 of the IC tag 50 receives through the antenna 57 a signal transmitted from the game machine 1, and then provides data concerning the received signal to the information processing part 51. The short-distance wireless communication part 52 transmits the data provided from the information processing part 51, through the antenna 57 to the game machine 1. The storage part 53 is constructed from a nonvolatile memory device. For example, the storage part 53 stores data like a given ID (IDentifier) number. In accordance with the data provided from the short-distance wireless communication part 52, the information processing part 51 reads data from the storage part 53. The information processing part 51 provides the read-out data to the short-distance wireless communication part 52 for the purpose of transmitting the data to the game machine 1. Here, in a configuration that the storage part 53 is data rewritable, the information processing part 51 writes the data into the storage part 53 in accordance with the data provided from the short-distance wireless communication part 52.

In the game machine 1 according to the present embodiment, in accordance with the attitude of the game machine 1 detected by the attitude detection part 25, a restriction processing part 31 of the information processing part 10 performs the processing of restricting communication with the card 5 performed by the short-distance wireless communication part 21. In the game machine 1, on the basis of the information obtained by communication with the card 5 performed by the short-distance wireless communication part 21, the game processing part 32 of the information processing part 10 performs game processing. The restriction processing part 31 and the game processing part 32 are software-based functional blocks implemented when the information processing part 10 executes the game program 91.

For example, the user uses a plurality of cards 5 on each of which a picture of one of different characters is drawn and in each of which the capability values such as the attack power, the defense power, and the physical strength of each character are described. The game processing part 32 of the game machine 1 performs the processing of causing a plurality of characters selected by the user to fight with each other on the basis of given rules, and then determining the victory or defeat. At a given timing like at the time of start of a game, the game processing part 32 displays onto the display part 11 a message prompting read of a card 5 selected by the user. Then, the game processing part 32 waits for communication with an IC tag 50 performed by the short-distance wireless communication part 21. The user performs the operation of selecting a favorite card 5 from the plurality of cards 5 owned by the user and then bringing the card close to the game machine 1. This operation allows the user to select a character to be used in the game.

On the basis of the detection result of the attitude detection part 25, the restriction processing part 31 of the game machine 1 restricts communication with the IC tag 50 performed by the short-distance wireless communication part 21. For example, the restriction processing part 31 adopts as a condition for short-distance wireless communication a condition that the attitude of the game machine 1 is horizontal or close to this and that the game machine 1 is stationary. Only when this condition is satisfied, the restriction processing part 31 permits communication with the IC tag 50 performed by the short-distance wireless communication part 21. When this condition is not satisfied, the restriction processing part 31 does not permit communication performed by the short-distance wireless communication part 21. The restriction processing part 31 displays a warning message and the like onto the display part 11. Such restriction avoids a situation that, for example, the user plays the game in an attitude easily causing disconnect in the communication between the game machine 1 and the IC tag 50.

The short-distance wireless communication part 21 performs communication with the IC tag 50 of the card 5 and receives, for example, the ID of the card 5. In this case, the game processing part 32 reads the capability values such as the offensive power, the defense power, and the physical strength of the character corresponding to the ID from the secondary storage part 16 or the recording medium 9, and then performs game processing. Here, for example, the game machine 1 may acquire the capability values of the character from an external device such as a server apparatus through the communication part 14. Further, the game machine 1 may acquire the capability values of the character stored, for example, in the storage part 53 of the IC tag 50 by communication through the short-distance wireless communication part 21.

When the IC tag 50 of the card 5 and the short-distance wireless communication part 21 perform communication in multiple times, the restriction processing part 31 judges whether the attitude of the game machine 1 satisfies the condition in each time of communication. That is, the restriction processing part 31 judges whether a state that the condition of the attitude is satisfied is maintained. When the condition is satisfied, the restriction processing part 31 permits each time of communication. For example, when the attitude of the game machine 1 does not satisfy the condition in one time of communication among the multiple times of communication, the game processing part 32 may wait to execute the game processing until the attitude satisfies the condition and the communication is restored. For example, the game processing part 32 may cancel the contents of already finished communication and then displays onto the display part 11 a message requesting redoing of communication. Here, the restriction processing part 31 may be constructed such as to restrict the first communication and then, after the completion of the first communication, not restrict the second and subsequent communication.

Further, for example, the restriction processing part 31 may be constructed such as to judge a condition other than the above-mentioned one and then, only when the condition is satisfied, permit communication with the IC tag 50 performed by the short-distance wireless communication part 21. For example, the restriction processing part 31 may perform judgment with a condition that the game machine 1 is in an attitude other than a horizontal attitude, like a vertically standing attitude and a turn-over attitude. For example, the restriction processing part 31 may perform judgment with adopting a condition that the game machine 1 is moved at a given speed or a higher speed. In these cases, the game processing part 32 displays onto the display part 11 a message requesting a given attitude. On the basis of the detection result of the attitude detection part 25, only when it is determined that the game machine 1 is in the given attitude, the restriction processing part 31 permits communication. The game machine 1 may change the condition for the attitude in accordance with the progress of the game, events, or the like. Thus, in the game machine 1, the operation of read of the card 5 itself or the operation of communication with the IC tag 50 itself may be enjoyable as a game by the user.

Figure 3:
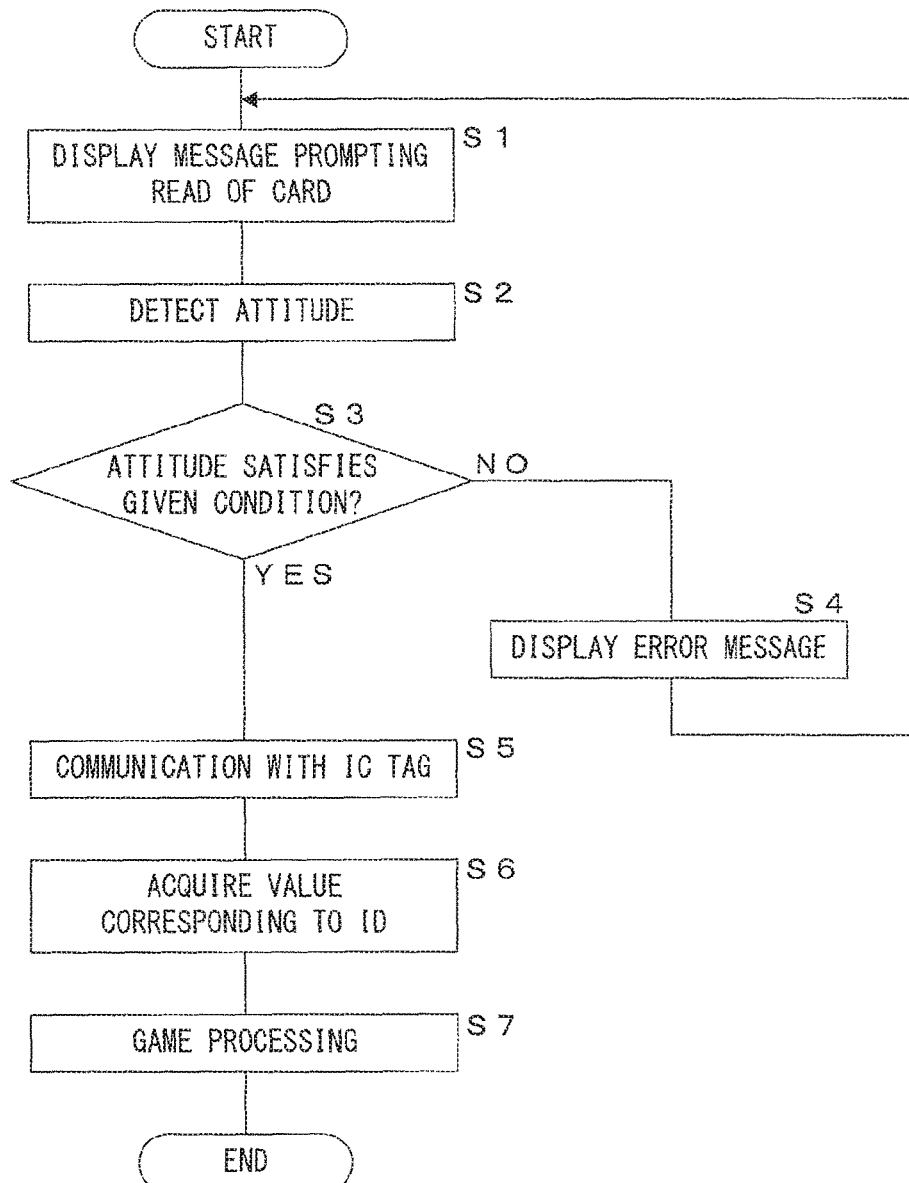
FIG. 3 shows an example non-limiting flow chart of a procedure of restriction processing for short-distance wireless communication performed by a game machine according to Embodiment 1.

FIG. 3 shows an example non-limiting flow chart of a procedure of restriction processing for short-distance wireless communication performed by the game machine 1 according to Embodiment 1. When read of the card 5, that is, communication with the IC tag 50, becomes necessary in association with the game processing performed by the game processing part 32 of the game machine 1, the information processing part 10 displays onto the display part 11 a message prompting read of the card 5 (step S1). The information processing part 10 detects the attitude of the game machine 1 by using the attitude detection part 25 (step S2). Then, the information processing part 10 judges by using the restriction processing part 31 whether the detected attitude satisfies a given condition (step S3). When the attitude does not satisfy the given condition (S3: NO), the restriction processing part 31 does not permit communication performed by the short-distance wireless communication part 21. Thus, the information processing part 10 displays onto the display part 11 an error message indicating that the attitude of the game machine 1 is inappropriate (step S4), and then returns the processing to step S1.

When the attitude of the game machine 1 satisfies the given condition (S3: YES), the restriction processing part 31 permits communication performed by the short-distance wireless communication part 21. Thus, the short-distance wireless communication part 21 performs communication with the IC tag 50 of the card 5 (step S5). As a result of the communication between the short-distance wireless communication part 21 and the IC tag 50, the information processing part 10 acquires the ID stored in the storage part 53 of the IC tag 50. The information processing part 10 acquires from the secondary storage part 16 a value corresponding to the ID received by the short-distance wireless communication part 21 through the communication with the IC tag 50 (step S6). The value corresponding to the ID is, for example, the capability value or the like of the character. In accordance with the acquired value, the information processing part 10 performs game processing by using the game processing part 32 (step S7), and then finishes the processing.

In the game machine 1 having the above-mentioned configuration according to Embodiment 1, in accordance with the attitude of the game machine 1 detected by the attitude detection part 25, communication with the IC tag 50 of the card 5 performed by the short-distance wireless communication part 21 is restricted. The attitude of the game machine 1 detected by the attitude detection part 25 is equal to input information to the game machine 1. Thus, for example, restriction in the usage mode of the game machine 1 may be realized. Further, for example, the operation of read of the card 5 itself may be enjoyable as a game. When an attitude condition for causing communication restriction is set up appropriately, effects of diverse kinds is achieved in correspondence to the set-up condition.

The present embodiment has been described for an example of a game that characters drawn on the cards 5 fight with each other. However, a similar technique may be applied to other games of various kinds and applications other than games. Further, the above-mentioned description has been given for a case that the present technique is applied to the portable game machine 1. However, employable applications are not limited to this. For example, the present technique may be applied to a game machine of floor-standing type. In this case, the short-distance wireless communication part 21 and the attitude detection part 25 may be provided in the controller or the like of the game machine of floor-standing type. Further, employable applications of the present technique are not limited to a game machine. For example, the present technique may be applied to various kinds of information processing apparatuses such as a portable telephone, a smart phone, a tablet type information terminal, and a PC (Personal Computer). Further, a configuration has been adopted that the IC tag 50 is mounted on the card 5. However, employable configurations are not limited to this. For example, the IC tag 50 may be mounted on a toy such as a miniature car, a doll, and a figure. Alternatively, the IC tag 50 may be mounted on other objects of various kinds. That is, an electronic media of various kinds other than the card type may be employed.

Further, the game machine 1 has been constructed such that in correspondence to the detection result of the attitude detection part 25, communication with the IC tag 50 performed by the short-distance wireless communication part 21 is restricted. Here, in the game machine 1, not the entirety of communication between the short-distance wireless communication part 21 and the IC tag 50 may be restricted. That is, in the game machine 1, for example, communication of reading particular data may be restricted. In the game machine 1, for example, communication of write of data into the IC tag 50 may be restricted. As such, the game machine 1 may be constructed such that a part of the communication function is restricted. Further, a configuration has been adopted that the game machine 1 and the IC tag 50 perform communication with each other in accordance with the NFC telecommunication standard. However, the communication may be performed in accordance with a telecommunication standard other than this. The game machine 1 has been constructed such that communication is restricted in correspondence to the attitude detected by the attitude detection part 25. However, the game machine 1 may be constructed such that communication is restricted in correspondence to the motion of the game machine 1 detected by the attitude detection part 25. The motion of the game machine 1 may include the moving direction and the moving speed of the game machine 1. A part or the entirety of the processing performed by the short-distance wireless communication part 21, the restriction processing part 31, and the game processing part 32 of the game machine 1 may be performed by other apparatus such as a server apparatus. A configuration has been adopted that the game machine 1 is provided with the attitude detection part 25 and that communication performed by the short-distance wireless communication part 21 is restricted in correspondence to the attitude detected by the attitude detection part 25. However, in addition to a configuration that communication is restricted in correspondence to the attitude of the game machine 1, the game machine 1 may be constructed such that communication is restricted in correspondence to input information from other input devices of diverse kinds as described in the following modifications.

(Modification 1)

In the game machine 1 according to Modification 1, the camera 22 is used for restriction of communication. In association with game processing performed by the game processing part 32, when communication with the IC tag 50 of the card 5 performed by the short-distance wireless communication part 21 becomes necessary, the information processing part 10 of the game machine 1 displays onto the display part 11 a message prompting the user for image acquisition of his/her own face through the camera 22. After that, the game machine 1 starts image acquisition through the camera 22. The information processing part 10 performs the face detection processing of detecting a person's face from the image acquired by the camera 22. When a face has been detected, the restriction processing part 31 permits communication with the IC tag 50 performed by the short-distance wireless communication part 21. When a face is not detected, the restriction processing part 31 does not permit communication.

Further, the information processing part 10 may perform the face authentication processing of judging whether the image of the registered user's face agrees with the face detected from the acquired image. In this case, when the registered face agrees with the detected face, the restriction processing part 31 permits communication performed by the short-distance wireless communication part 21. When the faces do not agree, the restriction processing part 31 does not permit communication. By virtue of this configuration, in the game machine 1 according to Modification 1, security performance is improved in the communication with the IC tag 50 of the card 5 performed by the short-distance wireless communication part 21. This technique is preferable, for example, for a case that the game machine 1 performs communication with a card 5 such as an electronic money device and an ATM card.

(Modification 2)

In the game machine 1 according to Modification 2, the microphone 23 is used for restriction of communication. When communication with the IC tag 50 of the card 5 becomes necessary, the information processing part 10 of the game machine 1 displays onto the display part 11 a message prompting the user to utter a voice into the microphone 23. After that, the game machine 1 starts accepting sound input through the microphone 23. The information processing part 10 judges whether, the sound volume of the sound inputted through the microphone 23 exceeds a given sound volume. When the input sound volume exceeds the given sound volume, the restriction processing part 31 permits communication with the IC tag 50 performed by the short-distance wireless communication part 21. When the input sound volume does not exceed the given sound volume, the restriction processing part 31 does not permit communication.

Further, the information processing part 10 may perform the voiceprint authentication processing of judging whether the registered user's voiceprint agrees with the voiceprint inputted through the microphone 23. Alternatively, the information processing part 10 may perform authentication processing based on the voice recognition of recognizing a voice inputted through the microphone 23 and then judging whether the voice agrees with a given keyword. In this case, when the authentication has succeeded, the restriction processing part 31 permits communication performed by the short-distance wireless communication part 21. When the authentication has failed, the restriction processing part 31 does not permit communication. By virtue of this configuration, in the game machine 1 according to Modification 2, security performance is improved in the communication with the IC tag 50 of the card 5 performed by the short-distance wireless communication part 21.

(Modification 3)

In the game machine 1 according to Modification 3, in accordance with an operating condition of the operation part 12, communication performed by the short-distance wireless communication part 21 is restricted. For example, in the game machine 1, the operation part 12 has six push buttons consisting of an A button to an F button as well as a cross key. When communication with the IC tag 50 of the card 5 becomes necessary, the information processing part 10 of the game machine 1 displays onto the display part 11 a message prompting a given operation to be performed on the operation part 12. An example of the given operation is that the A button and the C button are pushed and, at the same time, the cross key is operated rightward. The information processing part 10 judges the operating condition performed on the operation part 12. When a given operation has been performed on the operation part 12, the restriction processing part 31 permits communication performed by the short-distance wireless communication part 21. When a given operation is not performed, the restriction processing part 31 does not permit communication.

According to this configuration, the contents of a given operation required for read of the card 5 may be changed appropriately so that the operation of read of the card 5 itself may be enjoyed as a game. The user may register a favorite operation in advance. The game machine 1 may be constructed such that when a registered operation has been performed, communication performed by the short-distance wireless communication part 21 is permitted. By virtue of this, an operation performed on the operation part 12 may serve as authentication processing in place of password input. This improves the security performance in the game machine 1.

(Modification 4)

The game machine 1 according to Modification 4 includes an infrared-ray communication part (not illustrated) performing infrared-ray communication with another game machine 1. When communication with the IC tag 50 of the card 5 becomes necessary, the information processing part 10 of the game machine 1 displays onto the display part 11 a message prompting infrared-ray communication with the another game machine 1. After that, the game machine 1 starts infrared-ray communication through the infrared-ray communication part. The information processing part 10 judges whether infrared-ray communication with the another game machine 1 has been established, that is, whether a state where infrared-ray communication is available is maintained. When infrared-ray communication has been established, the restriction processing part 31 permits communication with the IC tag 50 performed by the short-distance wireless communication part 21. When infrared-ray communication is not established, the restriction processing part 31 does not permit communication.

As described in the modifications given above, a configuration may be employed that in accordance with input information from various kinds of input devices provided in the game machine 1, the restriction processing part 31 restricts communication with the IC tag 50 of the card 5 performed by the short-distance wireless communication part 21. Further, a configuration may be employed that an input device other than those described in Embodiment 1 and the modifications given above is mounted on the game machine 1 and then, in accordance with input information inputted through this input device, the restriction processing part 31 restricts communication. Employable such input devices include the temperature sensor 26, a humidity sensor, a luminance sensor, and an atmospheric pressure sensor. In this case, for example, the game machine 1 may be constructed such that when the temperature detected by the temperature sensor 26 exceeds a given temperature, communication performed by the short-distance wireless communication part 21 is permitted. When the temperature does not exceed the given temperature, the game machine 1 does not permit communication. Similar operation may be performed even when the game machine 1 is provided with a sensor other than these. Communication restriction performed by the restriction processing part 31 may be based on input information inputted through a plurality of input devices. It is not necessary for the game machine 1 to be provided with all components of the camera 22, the microphone 23, the GPS receiving part 24, the attitude detection part 25, and the temperature sensors 26 illustrated in FIG. 1. The game machine 1 may be constructed such as to include necessary ones alone among these.

Embodiment 2

In Embodiment 1 and its modifications given above, in accordance with input information from the input device, the restriction processing part 31 has restricted the entirety of communication performed by the short-distance wireless communication part 21. However, a configuration may be employed that not the entirety of communication is restricted. In Embodiment 2, a configuration is described that the restriction processing part 31 restricts a part of communication between the short-distance wireless communication part 21 and the IC tag 50.

In the game system according to Embodiment 2, the short-distance wireless communication part 21 of the game machine 1 is allowed to provide to the IC tag 50 of the card 5 a rewrite command for the data stored in the storage part 53. The game machine 1 according to Embodiment 2 includes the GPS receiving part 24 receiving a signal transmitted from a GPS satellite. In correspondence to the received result of the GPS receiving part 24, the information processing part 10 performs the processing of calculating the location of the game machine 1. The information processing part 10 may calculate the latitude, the longitude, and the like as the location.

For example, in a game, the user uses a plurality of cards 5 on each of which the name of a prefecture in Japan or a picture relevant to this is drawn. The game processing part 32 performs processing concerning the game that the user enjoys collection of the cards 5, record of actually visited prefectures, and the like. The storage part 53 of the IC tag 50 of each card 5 stores, in addition to the ID of the card 5, information indicating whether the prefecture described on the card 5 has been visited.

When the user performs read of the card 5 into the game machine 1, communication is performed between the short-distance wireless communication part 21 and the IC tag 50. The information processing part 10 of the game machine 1 is allowed to acquire from the IC tag 50 the ID of the card 5 stored in the storage part 53. The game machine 1 stores in advance information concerning prefectures in a manner of being in correspondence to the ID of the cards 5, together with the game program 91 in the secondary storage part 16 or the recording medium 9. For example, information concerning the prefectures may contain information on the ranges of the latitude and longitude of each prefecture. The information processing part 10 reads an information concerning the prefecture corresponding to the acquired ID. The information processing part 10 judges whether the location of the game machine 1 corresponding to the receiving result of the GPS receiving part 24 agrees with that of the prefecture corresponding to the ID of the card 5. When the location of the game machine 1 agrees with the prefecture corresponding to the ID, the restriction processing part 31 permits the short-distance wireless communication part 21 to transmit a write command to the IC tag 50. In response to the write command, the IC tag 50 stores information indicating that the prefecture has been visited, into the storage part 53. When the location of the game machine 1 does not agree with the prefecture corresponding to the ID, the restriction processing part 31 does not permit the short-distance wireless communication part 21 to transmit a write command.

Figure 4:
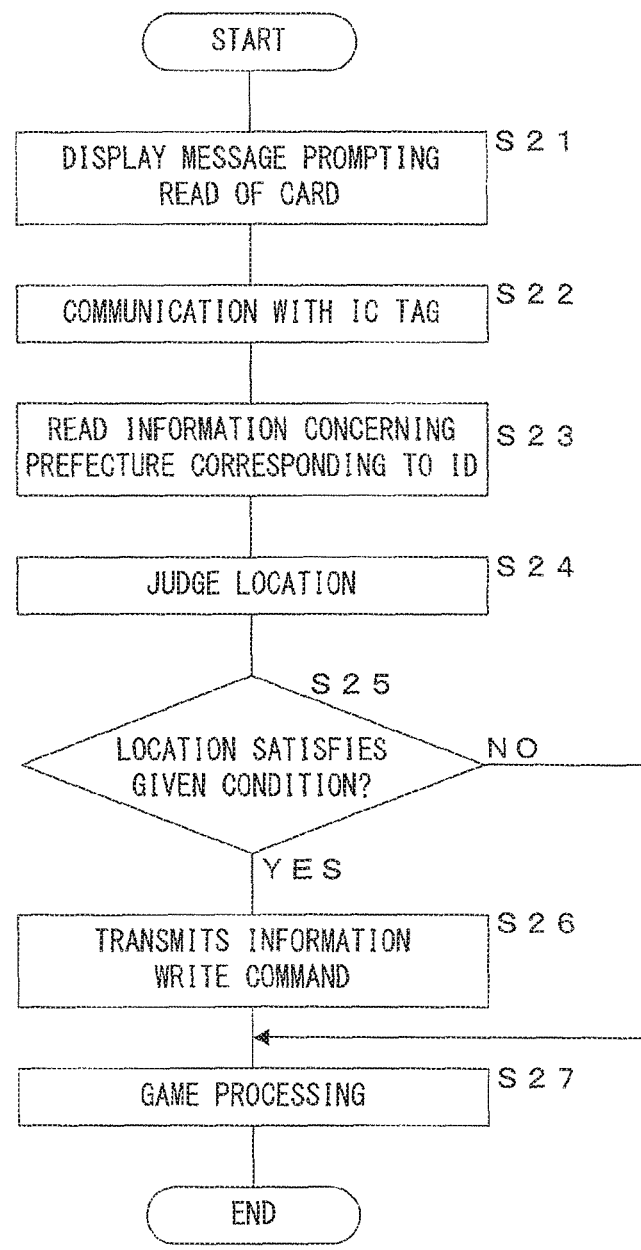
FIG. 4 shows an example non-limiting flow chart of a procedure of restriction processing for short-distance wireless communication performed by a game machine according to Embodiment 2.

FIG. 4 shows an example non-limiting flow chart of a procedure of restriction processing for short-distance wireless communication performed by the game machine 1 according to Embodiment 2. When read of the card 5, that is, communication with the IC tag 50, becomes necessary in association with the game processing performed by the game processing part 32 of the game machine 1, the information processing part 10 displays onto the display part 11 a message prompting read of the card 5 (step S21). The information processing part 10 allows communication with the IC tag 50 of the card 5 performed by the short-distance wireless communication part 21 (step S22). As a result, the information processing part 10 acquires the ID of the card 5 from the IC tag 50 and then reads the information concerning the prefecture corresponding to the ID of the card 5 from the secondary storage part 16 or the recording medium 9 (step S23).

In accordance with the result of receiving of a signal from the satellite through the GPS receiving part 24, the information processing part 10 judges the location of the game machine 1 (step S24). The restriction processing part 31 of the information processing part 10 judges whether the location of the game machine 1 satisfies a given condition (step S25). For example, the given condition may be that the location of the game machine 1 is a location corresponding to the prefecture read out at step S23. When the location of the game machine 1 satisfies the given condition (S25: YES), the restriction processing part 31 permits write command transmission performed by the short-distance wireless communication part 21. Thus, the information processing part 10 transmits an information write command to the IC tag 50 (step S26). The IC tag 50 having received the write command from the game machine 1 rewrites the information concerning whether the location has been visited which is stored in the storage part 53, into information indicating that the location has been visited.

When it is judged that the location of the game machine 1 does not satisfy the given condition (S25: NO), or alternatively after the transmission of the write command at step S26, the game processing part 32 of the information processing part 10 perform game processing corresponding to read of the card 5 (step S27), and then finishes the processing. The game processing performed at step S27 may contain the processing of displaying onto the display part 11 a map of the prefecture corresponding to the ID of the card 5.

In the game system having the above-mentioned configuration according to Embodiment 2, the information stored in the storage part 53 of the IC tag 50 is allowed to be rewritten. In accordance with the result of receiving of a signal from the satellite through the GPS receiving part 24, the game machine 1 restricts write command transmission performed by the short-distance wireless communication part 21. This configuration of the game machine 1 allows the user to enjoy the information rewriting itself in the card 5 as a game.

In Embodiment 2, a configuration has been adopted that restriction of information writing in the IC tag 50 of the card 5 is performed by the game machine 1 in correspondence to the receiving result of the GPS receiving part 24. However, the game machine 1 may be constructed such that the restriction is performed in correspondence to input information from other input device such as the attitude detection part 25 and the camera 22 described in Embodiment 1 and its modifications. An input device used for the restriction, a condition for the restriction onto the acquired input information, and the like may be set up appropriately. Thus, effects of diverse kinds corresponding to the contents of setting is obtained appropriately such as improvement in the security performance concerning information writing in the card 5.

The other points in the configuration of the game machine 1 according to Embodiment 2 are similar to those of the game machine 1 according to Embodiment 1. Thus, like parts are designated by like numerals and their detailed description is omitted.

Embodiment 3

Embodiments 1 and 2 given above have been described for a configuration that in accordance with input information from an input device such as the attitude detection part 25 and the GPS receiving part 24 provided in the game machine 1, communication with the IC tag 50 performed by the short-distance wireless communication part 21 is restricted. In contrast, in Embodiment 3, in accordance with the result of communication with the IC tag 50 performed by the short-distance wireless communication part 21, operation of various kinds of input/output devices provided in the game machine 1 is restricted.

In the game machine 1 according to Embodiment 3, the game program 91 is executed by the information processing part 10. During the time that the game processing part 32 performs game processing, communication with an external server apparatus is performed through the communication part 14. Thus, in the game machine 1, additional data for the game is allowed to be downloaded. For the purpose of download of pay additional data, in the game machine 1, communication is performed between the short-distance wireless communication part 21 and the card 5 such as a credit card and an electronic money card. In the game machine 1, payment processing for the fee of use of the card 5 needs be performed by transmitting and receiving information acquired from the card 5 to and from the server apparatus and the communication part 14.

The game machine 1 according to Embodiment 3 performs face authentication processing for the user through the camera 22. When the authentication has succeeded, the game machine 1 performs communication with the server apparatus through the communication part 14. For this purpose, an image of the user's face is stored in the secondary storage part 16 of the game machine 1. In place of the image of the user's face, the game machine 1 may store data obtained by extracting the feature of the user's face. The image of the user's face may be not stored in the game machine 1, and may be stored in the server apparatus. When payment processing is to be performed, the information processing part 10 of the game machine 1 displays onto the display part 11 a message prompting the user to read the card 5 and acquire the image of his/her own face through the camera 22. In response to this, the user performs the operation of bringing the card 5 close to the game machine 1 and, at the same time, performs the operation of image-acquisition of his/her own face through the camera 22.

In accordance with the result of communication with the IC tag 50 of the card 5 performed by the short-distance wireless communication part 21, the restriction processing part 31 of the game machine 1 according to Embodiment 3 performs the processing of restricting operation of the camera 22. The short-distance wireless communication part 21 periodically performs transmission processing. Depending on a situation whether a response to this has been received, the short-distance wireless communication part 21 detects the presence of the card 5 within the communication area. The short-distance wireless communication part 21 notifies the information processing part 10 of the detection result concerning the card 5. When the card 5 is not detected within the communication area of the short-distance wireless communication part 21, the restriction processing part 31 of the information processing part 10 does not permit the operation of the camera 22. Thus, the user is not allowed to perform image acquisition through the camera 22. Accordingly, the user fails in the face authentication processing and hence is not allowed to perform payment processing using the card 5.

When the card 5 has been detected within the communication area of the short-distance wireless communication part 21, the restriction processing part 31 permits the operation of the camera 22. Thus, the camera 22 is started. The information processing part 10 displays onto the display part 11 the image acquired by the camera 22. During a time period while a state in which the card 5 is detected by the short-distance wireless communication part 21 is maintained, the restriction processing part 31 continues permitting the operation of the camera 22. However, when the card 5 has become un-detected, the restriction processing part 31 does not permit the operation of the camera 22. Thus, when the card 5 is brought from a detected state into an un-detected state, the camera 22 stops the operation.

The information processing part 10 performs face authentication processing on the basis of the user's face image obtained by the image acquisition through the camera 22 and the face image stored in the secondary storage part 16. When the face authentication processing has succeeded, the information processing part 10 transmits information such as the ID of the card 5 necessary for payment processing, through the communication part 14 to the server apparatus. The information processing part 10 performs payment processing in accordance with a given procedure. Here, detailed description of the procedure of payment processing is omitted.

Figure 5:
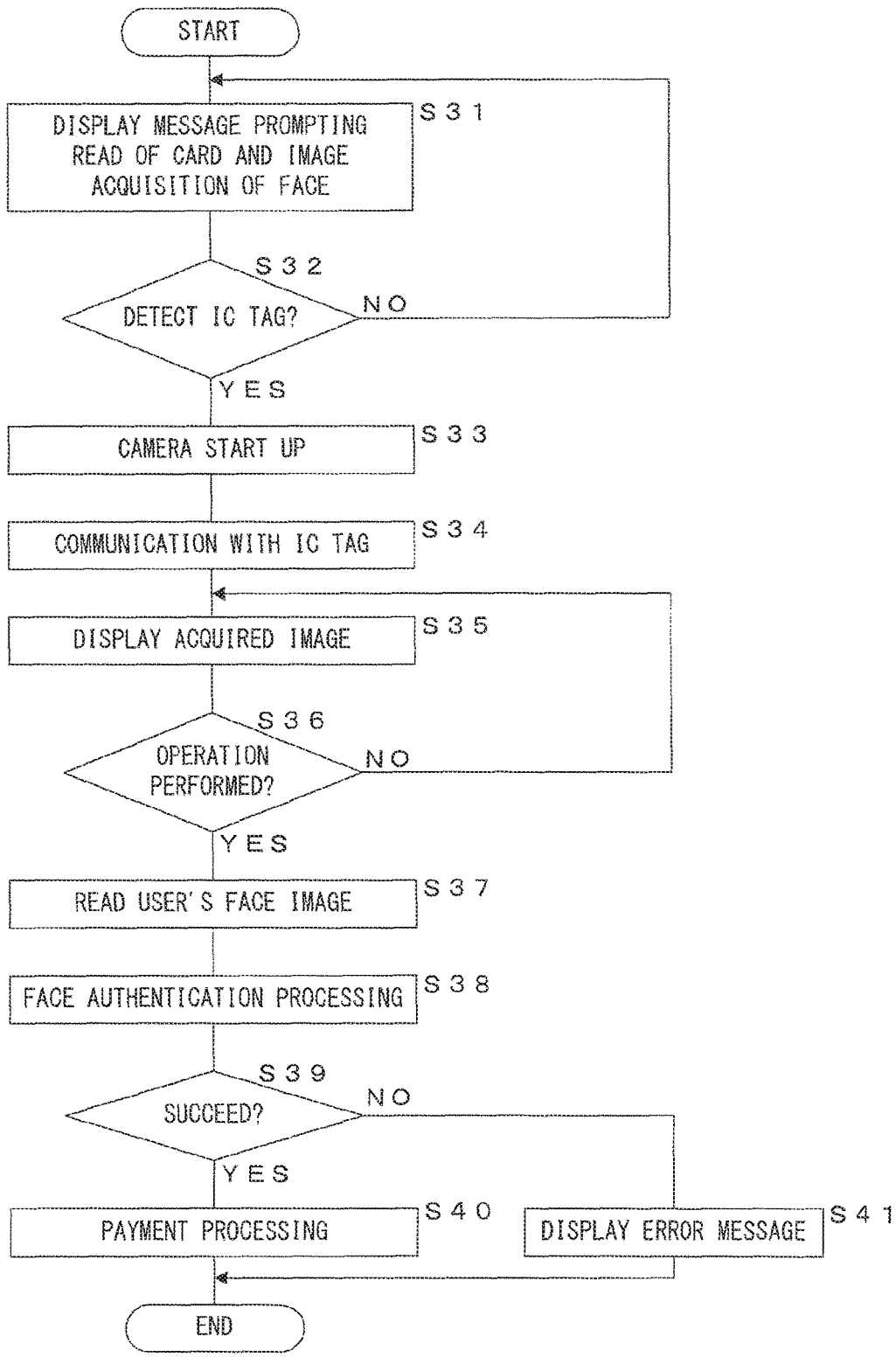
FIG. 5 shows an example non-limiting flow chart of a procedure of restriction processing for a camera performed by a game machine according to Embodiment 3.

FIG. 5 shows an example non-limiting flow chart of a procedure of restriction processing for the camera 22 performed by the game machine 1 according to Embodiment 3. Before the start of payment processing, the information processing part 10 of the game machine 1 displays onto the display part 11 a message prompting read of the card 5 and image acquisition of the user's face (step S31). The restriction processing part 31 of the information processing part 10 judges whether the IC tag 50 of the card 5 has been detected within the communication area of the short-distance wireless communication part 21 (step S32). When the IC tag 50 is not detected (S32: NO), the restriction processing part 31 returns the processing to step S31, without permitting the startup of the camera 22. The information processing part 10 continues displaying the message until the IC tag 50 is detected.

When the IC tag 50 has been detected within the communication area of the short-distance wireless communication part 21 (S32: YES), the restriction processing part 31 of the information processing part 10 permits the startup of the camera 22. Thus, the camera 22 starts up (step S33). The information processing part 10 causes the short-distance wireless communication part 21 to perform communication with the IC tag 50 (step S34) and thereby acquires necessary information. The information processing part 10 displays onto the display part 11 the image acquired through the camera 22 (step S35). In this state, the image displayed on the display part 11 is updated successively. For example, when the user performs a given operation on the operation part 12 of the game machine 1, the image of the user's face used for face authentication processing is determined. The information processing part 10 judges whether the given operation has been performed on the operation part 12 (step S36). When the given operation is not performed (S36: NO), the information processing part 10 returns the processing to step S35 and continues displaying the acquired image.

When the given operation has been performed on the operation part 12 (S36: YES), the information processing part 10 reads the user's face image stored in the secondary storage part 16 (step S37). The information processing part 10 performs the face authentication processing of judging whether the face image obtained by the image acquisition of the camera 22 and the face image read from the secondary storage part 16 belong to the same person (step S38). When the face authentication processing has succeeded (S39: YES), the information processing part 10 performs payment processing with the server apparatus through the communication part 14 (step S40) and then finishes the processing. When the face authentication processing has failed (S39: NO), the information processing part 10 displays an error message onto the display part 11 (step S41) and then finishes the processing.

In the game machine 1 having the above-mentioned configuration according to Embodiment 3, depending on a situation whether the IC tag 50 of the card 5 has been detected within the communication area of the short-distance wireless communication part 21, the restriction processing part 31 has restricted the startup of the camera 22. According to this configuration, startup of the camera 22 is restricted until the user performs operation of bringing the card 5 close to the game machine 1. This improves security in the face authentication processing and the payment processing performed by using the camera 22.

Embodiment 3 has been described for an example that in the game machine 1, payment processing is performed by using the card 5 and the camera 22. However, employable applications of the present technique are not limited to this. That is, the present technique may be applied to other various kinds of processing. A configuration has been adopted that depending on a situation whether the IC tag 50 of the card 5 has been detected within the communication area of the short-distance wireless communication part 21, startup of the camera 22 is restricted. However, employable conditions for restriction are not limited to this. For example, the game machine 1 may be constructed such that in addition to the detection of the IC tag 50, depending on a situation whether data received by the short-distance wireless communication part 21 from the IC tag 50 satisfies a given condition, startup of the camera 22 is restricted. In the game machine 1, for example, judgment may be performed with adopting as the given condition a condition whether the ID of the card 5 agrees with the registered one. This configuration is described below in the following Modification 1 with reference to a flow chart.

(Modification 1)

FIG. 6 shows an example non-limiting flow chart of a procedure of restriction processing for the camera 22 performed by the game machine 1 according to Modification 1 of Embodiment 3. The information processing part 10 of the game machine 1 according to Modification 1 displays onto the display part 11 a message prompting read of the card 5 and image acquisition of the user's face (step S51). The information processing part 10 judges whether the IC tag 50 of the card 5 has been detected within the communication area of the short-distance wireless communication part 21 (step S52). When the IC tag 50 is not detected (S52: NO), the information processing part 10 returns the processing to step S51 and continues displaying the message until the IC tag 50 is detected.

When the IC tag 50 has been detected within the communication area of the short-distance wireless communication part 21 (S52: YES), the information processing part 10 performs communication with the IC tag 50 (step S53). The information processing part 10 receives data stored in the IC tag 50. The restriction processing part 31 of the information processing part 10 judges whether given data has been received from the IC tag (step S54). For example, the restriction processing part 31 judges whether the ID received from the IC tag 50 agrees with the ID stored in the secondary storage part 16.

When the given data is not yet received from the IC tag 50 (S54: NO), the restriction processing part 31 does not permit the startup of the camera 22. The information processing part 10 displays an error message onto the display part 11 (step S41) and then finishes the processing. When the given data has been received from the IC tag 50 (S54: YES), the restriction processing part 31 permits the startup of the camera 22. Thus, the camera 22 starts up (step S55). Here, the processing performed after the startup of the camera 22 is the same as steps S35 to S41 in the flow chart illustrated in FIG. 5. Thus, its description is omitted.

The game machine 1 has been constructed such that in accordance with the result of communication with the IC tag 50 performed by the short-distance wireless communication part 21, startup of the camera 22 is restricted. However, employable targets of restriction are not limited to this. As described in the following Modifications 2 to 5, the game machine 1 may be constructed such that operation of various kinds of input/output devices is restricted.

(Modification 2)

Depending on a situation whether the IC tag 50 of the card 5 has been detected within the communication area of the short-distance wireless communication part 21, the game machine 1 according to Modification 2 restricts the startup of the microphone 23. For example, in place of the above-mentioned face authentication processing performed by using the camera 22, the game machine 1 performs voiceprint authentication processing by using the microphone 23. When payment processing is to be performed, the information processing part 10 of the game machine 1 displays onto the display part 11 a message prompting the user for read of the card 5 and input of sound through the microphone 23. In response to this, the user performs the operation of bringing the card 5 close to the game machine 1 and, at the same time, utters a given keyword or the like so as to input sound into the microphone 23. When the card 5 is not detected within the communication area of the short-distance wireless communication part 21, the restriction processing part 31 of the game machine 1 does not permit the operation of the microphone 23. Thus, the user is not allowed to perform sound input through the microphone 23. Thus, voiceprint authentication is not allowed and hence payment processing using the card 5 is not allowed. This improves security in the voiceprint authentication processing and the payment processing performed by using the microphone 23.

For example, in the game machine 1, the game processing of recording the sound inputted through the microphone 23 may be performed by the game processing part 32. For example, in the game machine 1, the game processing part 32 may perform the game processing of transmitting the sound inputted through the microphone 23 to another game machine 1 through the communication part 14 and thereby realizing a conversation. For example, in the game machine 1, the game processing part 32 may perform the game processing of performing sound recognition on the sound inputted through the microphone 23 and thereby performing moving operation or the like for a character. In these cases, when the IC tag 50 of the card 5 is not detected within the communication area of the short-distance wireless communication part 21, the restriction processing part 31 of the game machine 1 does not permit the startup of the microphone 23. Thus, the user is not allowed to perform the above-mentioned game processing using the microphone 23 unless read of the card 5 is performed, that is, unless the operation of bringing the card 5 close to the game machine 1 is performed. In the game processing, when the use of the microphone 23 is restricted by using the card 5, a game property is imparted to the user's use itself of the microphone 23.

(Modification 3)

In the game machine 1 according to Modification 3, depending on a situation whether the IC tag 50 of the card 5 has been detected within the communication area of the short-distance wireless communication part 21, acceptance of an input operation through the operation part 12 is restricted. For example, the game machine 1 is provided with six push buttons consisting of an A button to an F button in the operation part 12. The game processing part 32 performs the game processing for an action game of causing a character to take an action such as run, jump, and attack in correspondence to the push operation onto each push button. When the IC tag 50 of the card 5 is not detected within the communication area of the short-distance wireless communication part 21, the restriction processing part 31 of the game machine 1 restricts acceptance of operation of a push button, for example, corresponding to an offensive action. This restriction may preferably be combined with the game processing of changing the details of attack by a character in correspondence to the type of the card 5. As such, when acceptance of a particular operation through the operation part 12 is restricted, a new game property is imparted to the operation of the user's character.

For example, in payment processing using the card 5, when a password or the like is inputted through the operation part 12, the restriction processing part 31 may restrict the reception of operation through the operation part 12 in correspondence to the detection result concerning the card 5. This improves security in the payment processing. For example, the operation part 12 may be constructed from a touch panel. In this case, the restriction processing part 31 may be constructed such that, for example, acceptance of contact operation on the touch panel is restricted entirely. The restriction processing part 31 may be constructed such that, for example, sliding operation from the left to the right is solely restricted.

(Modification 4)

Depending on a situation whether the IC tag 50 of the card 5 has been detected within the communication area of the short-distance wireless communication part 21, the game machine 1 according to Modification 4 restricts display on the display part 11. For example, in the game machine 1, a touch panel serving as the operation part 12 is provided in the display part 11. The game processing part 32 performs the processing of displaying onto the display part 11 a menu, icons, or the like used for operation through the touch panel. When the IC tag 50 of the card 5 is not detected within the communication area of the short-distance wireless communication part 21, the restriction processing part 31 of the game machine 1 restricts the display of the menu, the icons, and the like used for touch panel operation in the display part 11. At that time, the restriction processing part 31 may restrict acceptance of operation through the touch panel. When such a configuration is applied, for example, to payment processing using the card 5 or the like, security is improved in the payment processing.

(Modification 5)

Depending on a situation whether the IC tag 50 of the card 5 has been detected within the communication area of the short-distance wireless communication part 21, the game machine 1 according to Modification 5 restricts sound output through a speaker (not illustrated). For example, when the IC tag 50 of the card 5 is not detected within the communication area of the short-distance wireless communication part 21, the restriction processing part 31 of the game machine 1 restricts the speaker output of conversation by characters, BGM, a sound effect, and the like in the game. Thus, for example, in a game in which the user's listening of sound outputted from the speaker is of an important factor, a new game property may be added to the listening of sound.

The other points in the configuration of the game machine 1 according to Embodiment 3 are similar to those of the game machine 1 according to Embodiment 1. Thus, like parts are designated by like numerals and their detailed description is omitted.

In the present specification, it is to be understood that description of an element expressed in a singular form provided with an article "a" or "an" does not exclude a configuration employing a plurality of elements each corresponding to the mentioned single element.

In the game machine 1 according to Embodiments 1 to 3, in accordance with one of the operations consisting of the function of wireless communication with the communication device and the function of input or output of information, the other operation is restricted. Thus, in the game machine 1, a situation is restricted that one of the functions is exclusively used unconditionally. When the operating condition for one function to be satisfied for causing the operation of the other function is set up appropriately, improvement in the security performance and the like is realized.

What is claimed is:

1. An information processing system comprising:
   a communication device including a first wireless communication part performing the processing of transmission and reception of data to and from an information processing apparatus through short-distance wireless communication; and
   an information processing apparatus including:
      a second wireless communication part performing the processing of transmission and reception of data to and from the communication device through short-distance wireless communication,
      a processing part performing processing concerning input or output of information, the processing part including a camera configured to acquire image data,
      a restriction part, restricting the second wireless communication part in accordance with input from the camera,
      an information processing part performing information processing corresponding to a processing result of the second wireless communication part or the processing part whose processing is not restricted by the restriction part, determine whether or not the communications device is within a communication range of the wireless transceiver for performing short-distance wireless communication, based on determination that the communications device is not within the communication range, restrict functionality of the camera, and based on determination that the communications device is within the communication range, enable functionality of the camera.

2. The information processing system according to claim 1, wherein the restriction part permits data transmission and reception to and from the communication device performed by the second wireless communication part when input information processed by the processing part satisfies a given condition, and the restriction part does not permit data transmission and reception to and from the communication device performed by the second wireless communication part when the input information does not satisfy the given condition.

3. The information processing system according to claim 2, wherein the restriction part, during a time period while a state in which the input information satisfies the given condition is maintained, continues permitting data transmission and reception to and from the communication device performed by the second wireless communication part.

4. The information processing system according to claim 1, wherein the restriction part permits the processing performed by the processing part when transmission or reception information obtained as a result of data transmission or reception processing performed by the second wireless communication part satisfies a given condition, and the restriction part does not permit the processing performed by the processing part when the transmission or reception information does not satisfy the given condition.

5. The information processing system according to claim 4, wherein:

the second wireless communication part performs the processing of detecting that the communication device is present in an effective communication range; and the restriction part permits the processing performed by the processing part when the second wireless communication part detects the communication device, and the restriction part does not permit the processing performed by the processing part when the second wireless communication part does not detect the communication device.

6. The information processing system according to claim 5, wherein the restriction part, during a time period while a state in which the second wireless communication part is detecting the communication device is maintained, continues permitting the processing performed by the processing part.

7. The information processing system according to claim 4, wherein the restriction part permits the processing performed by the processing part when the second wireless communication part performs given data transmission or reception to or from the communication device, and the restriction part does not permit the processing performed by the processing part when the second wireless communication part dose not perform the given data transmission or reception to or from the communication device.

8. The information processing system according to claim 1, wherein the processing part is composed of a sensor inputting information concerning a state of the information processing apparatus.

9. The information processing system according to claim 8, wherein the sensor detects attitude or motion of the information processing apparatus.

10. The information processing system according to claim 1, wherein the processing part inputs sound information obtained by a microphone.

11. The information processing system according to claim 1, wherein the processing part inputs information concerning the position of the information processing apparatus.

12. The information processing system according to claim 1, wherein the processing part is composed of a sensor inputting information concerning an environment surrounding the information processing apparatus.

13. The information processing system according to claim 1, wherein the first wireless communication part and the second wireless communication part perform transmission and reception of data through contactless communication.

14. A game system comprising:
a communication device including a first wireless communication transceiver for transmission and reception of data using short-distance wireless communication;
a camera configured to acquire image data; and
a game machine including:
a second wireless communication transceiver for transmission and reception of data to and from the communication device through the short-distance wireless communication,
at least one hardware processor configured to:
execute a video game that uses inputs provided by a user of the game machine,
process image data that has been acquired by the camera,
control transmission and/or reception functionality of the second wireless communication transceiver based on how the image data is processed,
determine whether or not the communications device is within a communication range of the wireless transceiver for performing short-distance wireless communication,
based on determination that the communications device is not within the communication range, restrict functionality of the camera, and
based on determination that the communications device is within the communication range, enable functionality of the camera.

15. An information processing apparatus comprising:
a wireless transceiver configured to communicate, via short-distance wireless communication, data with a communications device;
a camera configured to acquire an image;
a processing system that includes at least one hardware processor, the processing system configured to:
execute a video game using inputs provided by a user of the information processing apparatus,
process the image acquired by the camera to obtain a processing result, and
restrict functionality of the wireless transceiver based on how the image has been processed, determine whether or not the communications device is within a communication range of the wireless transceiver for performing short-distance wireless communication, based on determination that the communications device is not within the communication range, restrict functionality of the camera, and based on determination that the communications device is within the communication range, enable functionality of the camera.

16. The information processing apparatus of claim 15, wherein the functionality of the wireless transceiver is restricted based on the obtained processing result being an invalid processing result, and wherein the functionality of the wireless transceiver is enabled based on the obtained processing result being a valid processing result.

* * * * *